March 5, 1940. H. J. GLAXNER Re. 21,379
METHOD OF MAKING AGGREGATES OF CARBON BLACK
Original Filed Nov. 6, 1933
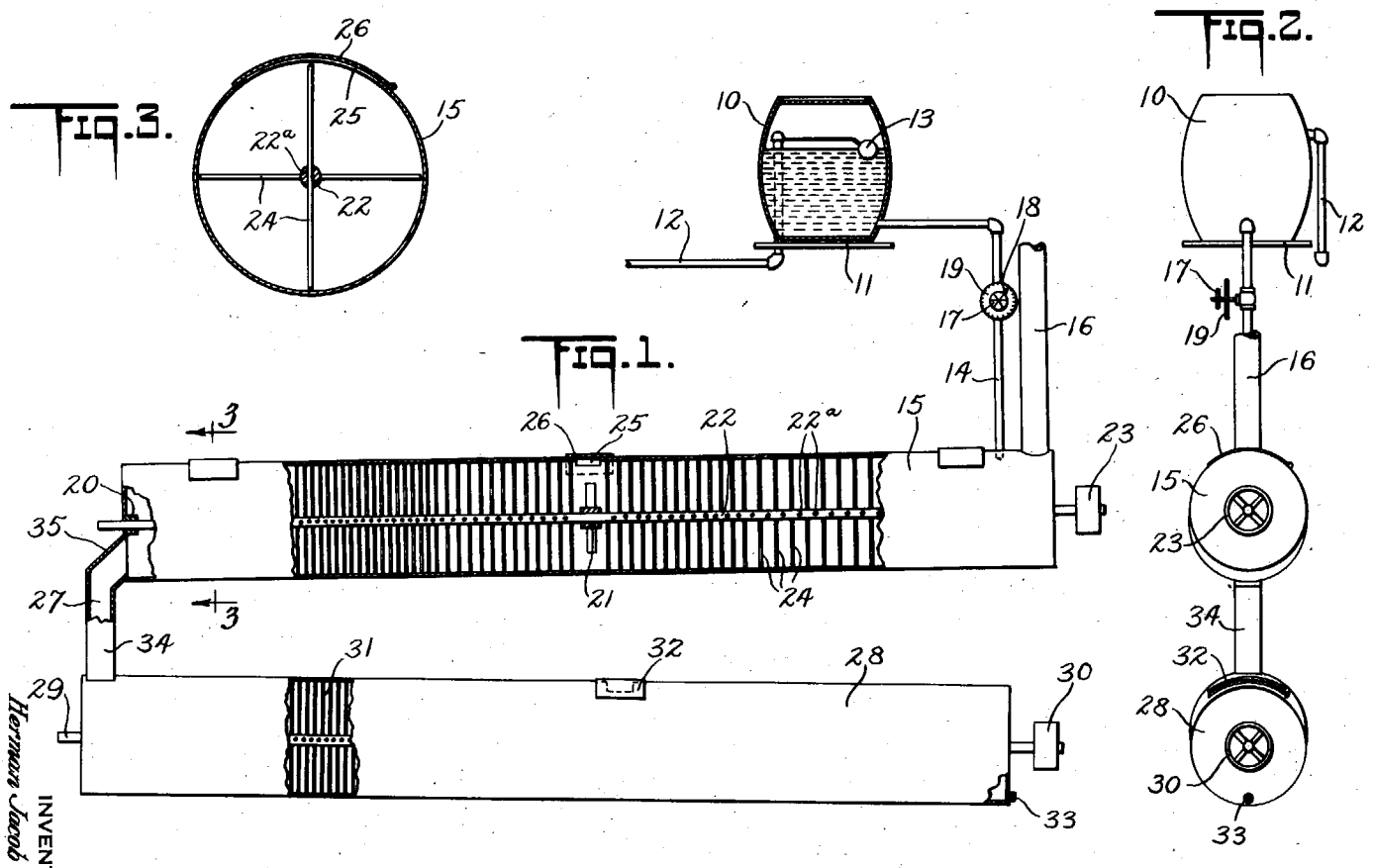
INVENTOR
Herman Jacob Glaxner
BY
Dean Fairbank Hersch & Foster
ATTORNEYS Reissued Mar. 5, 1940

Re. 21,379

UNITED STATES PATENT OFFICE 21,379

METHOD OF MAKING AGGREGATES OF CARBON BLACK

Herman Jacob Glaxner, deceased, late of Monroe, La., by Columbian Carbon Company, New York, N. Y., assignee Original No. 2,065,371, dated December 22, 1936, Serial No. 696,774, November 6, 1933. Application for reissue August 3, 1939, Serial No. 288,176

1 Claim. (Cl. 134—60)

The term carbon black is used herein in its broader sense to include lamp black, gas black and other black analogous carbon substitutes commonly employed as pigments or fillers. Furthermore, the apparatus and process may be successfully utilized in treating other finely divided material of a flocculent nature and particularly for transforming an impalpable powder into relatively minute granules or dustless aggregate so as better to adapt it for purposes of handling, shipment or storage and use.

Certain characteristics of carbon black which render it particularly valuable in the manufacture of rubber compositions, phonograph records, various wax and resin compositions, printers' ink and other preparations are its extremely fine state of sub-division together with its capability of being uniformly dispersed in rubber, waxes, oils and the like.

Carbon black as manufactured is such a very light, fine powder that normally ten pounds or less occupy a package of one cubic foot. Such light, bulky material is expensive to pack, ship and store, and handling the light powder causes it to fly in the air to such an extent that there is not only substantial loss of material but great annoyance to workmen breathing the dusty air.

An object of the present invention is to so treat the carbon black that it is decreased in bulk for purposes of shipment, storage and handling and so that it is substantially dustless in handling and yet capable of ready and uniform dispersion.

It has heretofore been proposed to accomplish these results by the formation of aggregates or pellets of carbon black substantially free from the occluded gases which cause the powder to be so bulky, the pellets themselves being readily crushable to return the carbon to its original pulverulent condition.

Insofar as the process is concerned, an object of the invention is to simplify the process of manufacturing the carbon black aggregates by avoiding the need for using two immiscible liquids and by providing a process involving merely the addition of water to the black, mechanical agitation and drying. No heat treatment or chemical agent is used in forming the dustless granules and drying of the granules may be accomplished in any conventional manner. No screening, filtering, decanting or other separating step is necessary.

A further object is to provide a process of manufacturing the carbon black requiring no delicacy of technique and capable of perfect control simply by varying the speed of the agitation and the percentage of the liquid which is mixed with the black.

Insofar as the apparatus is concerned, an object of the invention is to provide an extremely simple apparatus consisting merely of agitating means and means for feeding the carbon black and liquid into it and automatically operative to transform the carbon black and liquid into minute granular aggregates which need only to be dried to produce the finished product.

The invention may be more fully understood from the following description in connection with the accompanying drawing, wherein:—

Fig. 1 is a somewhat diagrammatic view of an apparatus embodying the invention, parts of this apparatus being shown in section and parts in elevation, Fig. 2 is an end elevational view of the apparatus shown in Fig. 1, and Fig. 3 is an enlarged transverse sectional view on the line 3—3 of Fig. 1.

Referring with more particularity to the drawing, 10 represents a reservoir mounted upon a suitable support 11 and into which a suitable liquid such as water flows from a pipe 12, the water in the reservoir being kept at a constant level by the float valve 13. Water drains by gravity from the reservoir 10 through a pipe 14 into the inlet end of a cylinder or tube 15. The carbon black is delivered into the inlet end of this cylinder through a pipe 16. Any suitable means (not shown) may be used for delivering carbon black at a constant rate through pipe 16 and the amount of water which flows into the cylinder to mix with the carbon black may be controlled by a needle valve 17 in the pipe 14. The handle of this valve preferably carries a pointer 18 reading upon a fixed scale 19 associating with the valve stem so that the setting of the valve is always visually indicated and micrometric adjustments of the valve may be made.

Cylinder 15 which is closed at both ends inclines slightly downwardly from its inlet to its outlet end. Bearings such as 20 at the ends of the cylinder cooperate with a central bearing 21 to support a shaft 22, the axis of which coincides with the longitudinal axis of the cylinder. The projecting end of the shaft 22 carries a pulley 23 or other suitable power receiving means.

A plurality of agitator arms 24 are fixed upon the shaft 22. As seen in Fig. 3 these arms extend through and are fixed within transverse openings 25 in the shaft 22, each arm projecting equal distances from opposite sides of the shaft and having its ends terminating just short of the wall of the cylinder. Alternate arms are arranged at right angles to each other.

The arms occupying approximately that third of the cylinder adjacent the inlet end of the latter are spaced somewhat farther apart than the arms occupying the central third of the cylinder and those arms occupying the third of the cylinder toward the outlet end are spaced even a less distance apart.

At intervals throughout its length, the stationary inclined cylinder 15 may have a number of inspection openings 25 in its top, these openings being normally closed by pivoted cover plates 26. They are designed to permit observation of the process which is going on in the cylinder 15 and the central closure 26 may be opened to provide access to the central bearing 21.

Material from the outlet end of the cylinder 15 passes through a pipe 27 into the inlet end of a substantially horizontally disposed cylinder 28 arranged beneath the cylinder 15. The two cylinders are of generally similar construction, cylinder 28 having a central shaft 29 corresponding to shaft 22 and a driving pulley 30 corresponding with pulley 23. The shaft 29 likewise carries agitator arms 31 corresponding to the arms 24 but arranged at the same distance apart as the arms in the lower third of the cylinder 15. Cylinder 28 may be provided with an opening and with a trap door 32 through which the central bearing thereof may be inspected.

The outlet from the cylinder 28 is through a relatively small discharge passage 33. The pipe through which material passes by gravity from the upper to the lower cylinder includes a vertical portion 34 discharging into the lower cylinder and an angularly disposed portion 35 disposed at approximately a 45° angle to the longitudinal axis of the upper cylinder and communicating with such cylinder below the shaft bearing 20.

Before explaining the operation of the apparatus or the method of carrying out and controlling the process, it may be noted that in a typically commercial installation which he has found to be satisfactory for the purpose, each cylinder may be about eighteen feet long and about thirty inches in diameter. The agitator arms near the inlet end of the upper cylinder 15 are arranged on approximately 2" centers and the arms themselves are about ⅝ of an inch in diameter. At the central third of the cylinder the arms are set on about 1½" centers and at the lower third of the cylinder 15 and throughout the length of the cylinder 28, the arms may be arranged on 1" centers. The agitator arms 24 are of proper diameter to fit snugly within the openings in their supporting shaft and a spot weld on each arm may be made just against the shaft to keep the arm from slipping after it has been driven through the shaft to an extent where it projects an equal distance from opposite sides thereof.

It may be noted here that it is within the scope of the invention to use one long cylinder instead of two shorter ones but for practical purposes it is undesirable to impose too great a torque on the relatively light shaft which carries the agitator arms. Accordingly he prefers to use the two cylinders and shafts and driven pulleys. The operation of the device is substantially as follows:—

With the shafts of both cylinders rotating (a speed of about 70 R. P. M. has proven satisfactory), the carbon black and water are admitted into the inlet end of cylinder 15. The water, incidentally, may be chemically pure but commercially pure water is in general satisfactory.

The water and the carbon black form a relatively heavy doughy mass in the higher or inlet end of the upper tube 15. By observation it can be readily discerned whether this dough is of proper consistency. The valve 17 can be accordingly adjusted until the desired consistency of the doughy mass is obtained. In practice the admission of carbon black and water in about equal amounts of weight has proven very satisfactory.

By the time the continuously agitated mass has reached the middle of the tube 15, the carbon black should be just a little more moist than a lump of carbon black formed by a drop of water falling into loose carbon. If the central inspection door of the tube 15 be opened and a small lump of the wetted carbon black removed, the lump should be almost stiff enough to break instead of being of a plastic and sticky consistency.

By the time the wet carbon black gets to the outlet tube 27, part of it is already in the form of pellets or granules free from occluded gases and the work is completed in the cylinder 28. The outlet opening of the cylinder 15 is of such a size and so positioned as to prevent too rapid passage of material from the tube 15 into the tube 28 and thereby avoiding overburdening the shaft and agitators of the latter tube or cylinder.

So far as he has been able to determine by observation, the discharge of carbon black from the cylinder 15 is somewhat as follows:—

The agitator arms 24 on the shaft 22 run close to the end of the tube and have a tendency to throw the material sideways. This conclusion is drawn from the fact that the arms being round or packed up to an edge with dough, the dough balls are knocked out of the path of the arms by the arms themselves, otherwise the dough would be ahead of the arms and would have no way of freeing itself from adhering to the pin. This adhesion does occur to a certain extent until a wedge shape formation of dough is built up to a sharp edge on the front side of each arm. As this dough is forced sideways from the arm next to the outlet end of the cylinder, some of it hits the outlet end and is allowed to enter the lower cylinder through the connecting pipe. This gives about the proper restriction to prevent too rapid release of the material being worked upon, into the lower cylinder. The speed of release may also be controlled to some extent by the inclination of the upper cylinder. However if this inclination is too steep it allows an accumulation of dough at the outlet end and causes the agitator arms adjacent said end to do most of the work. By a correct inclination, the work of the agitator arms will be equalized throughout the length of the tube and he has found that about 3 or 4 inches drop in 18 feet is an inclination which works out successfully with proper distribution of the work to all of the agitator arms, assuming that the proper mixture is being fed into the upper end of the cylinder.

For a while after the machine is started, part of the doughy mass sticks to the cylinder, forming a thin coat of paste all around it. As this coat builds up, the pins near it cut it loose although it builds slightly more between the path of the pins. In operation, aside from this thin coating near the inlet end of the upper cylinder, the mixture is capable of movement at all times since the pins are set so close together and travel at such speed that the lumps and pellets which they form are kept flying at all times.

The action which takes place in the cylinder 28 is similar to that which takes place in the cylinder 15 except that it completes the operation, reducing the moist carbon black to small granular sized, spherical aggregates. While the cylinder 28 might be slightly inclined if desired, it operates successfully even though horizontal, apparently for the reason that as the dough forms into pellets or granules, they have a tendency to travel faster and easier. As these granules are forced out of the outlet of the cylinder 28 they are of substantially uniform spherical shape and of substantially uniform size (typically) in the order of .025 of an inch in diameter.

The granular spherical aggregates delivered from the cylinder 28 may be dried in any conventional manner and are then ready for packaging and shipment.

The process is characterized by its complete lack of any complex technique and by the ease with which the uniformity of the finished product may be controlled. For any given amount of carbon black introduced continuously into the pipe 16 a roughly corresponding amount by weight of water should be introduced through the pipe 14. The inspection windows in the cylinder 15 make it readily apparent if improper proportions are being introduced and so that the necessary micromatic adjustment of the valve controlling the water flow may be made. With cylinders of definite length and with the proper proportions of water and carbon black entering the upper cylinder, the only variable factor is the speed of operation of the agitator shafts and he has discovered that by increasing or decreasing the speed of these shafts either larger or smaller spherical aggregates may be formed.

Even careful observation of the process has not yet enabled him to be dogmatic in advancing an explanation of the reasons for the production of substantially spherical uniform sized aggregates, but he may advance the tentative theory that substantially every physical contact which is had between the moist carbon black lump aggregates and the walls of the cylinders or the agitator arms, is productive of a balling effect, that is to say, whether the lumps of wet carbon are struck by the arms which are of circular shape or rolled down the surfaces of the cylinder, all of the physical contacts of the apparatus with such aggregates and also the combination of all such contacts apparently tends to roll them into substantially spherical shape. The size of the spheres produced is apparently controlled to some extent by the spacing of the agitator arms and to some extent by the speed of agitation.

Having thus described his invention, what he claims as new and desires to secure by Letters Patent is:—

He claims:

The method of making generally spherical, relatively minute aggregates of carbon black, which are in the order of .025 of an inch in diameter, and substantially devoid of occluded gases, which includes the steps of mixing approximately equal quantities of water and carbon black to form a pasty mass, and progressively advancing the mass through an elongated path, and simultaneously forming said aggregates by subjecting the advancing mass to the action of a multiplicity of impacts caused by agitators of small cross-sectional area, spaced apart at comparatively small distances, and movable transversely of the direction of advancing movement of said mass.

COLUMBIAN CARBON COMPANY,
*Assignee of Herman Jacob Glaxner, Deceased,*
By REID L. CARR,
*Secretary and Vice President.*